United States Patent [19]

Nieberding

[11] Patent Number: 5,069,618

[45] Date of Patent: Dec. 3, 1991

[54] METHOD AND KILN FOR FIRING CERAMIC ARTICLES

[76] Inventor: Jean-Louis Nieberding, Frepert 82, B-4729 Hauset, Belgium

[21] Appl. No.: 514,705

[22] Filed: Apr. 26, 1990

[30] Foreign Application Priority Data

Apr. 27, 1989 [DE] Fed. Rep. of Germany ....... 3913887
Jul. 7, 1989 [DE] Fed. Rep. of Germany ....... 3918585

[51] Int. Cl.⁵ .............................................. F27B 9/00
[52] U.S. Cl. .................................. 432/137; 432/144; 432/152; 432/82
[58] Field of Search ............... 432/128, 133, 136, 137, 432/141, 144, 152, 82

[56] References Cited

U.S. PATENT DOCUMENTS

| 3,336,018 | 8/1967 | Cuvelier | 432/82 |
| 4,449,923 | 5/1984 | Shimosato | 432/82 |
| 4,569,658 | 2/1986 | Wiggins et al. | 432/144 |
| 4,588,378 | 5/1986 | Yamamoto et al. | 432/152 |
| 4,767,320 | 8/1988 | Sasaki et al. | 432/152 |
| 4,790,749 | 12/1988 | Mauro | 432/152 |
| 4,878,838 | 11/1989 | Verheyden, Jr. | 432/152 |

FOREIGN PATENT DOCUMENTS 21776 6/1952 Fed. Rep. of Germany.

Primary Examiner—Henry C. Yuen
Attorney, Agent, or Firm—Shefte, Pinckney & Sawyer

[57] ABSTRACT

In a tunnel kiln or other through-type kiln having aligned successive preheating, firing and cooling zones, counter-current air flows are provided in the preheating and cooling zones while essentially isolating the firing zone from air exchange by circulating air between the preheating and cooling zones through external conduits bypassing the firing zone, thereby substantially reducing energy consumption and providing environmentally safe exhaust from the kiln without substantial expense for air filtration.

13 Claims, 1 Drawing Sheet

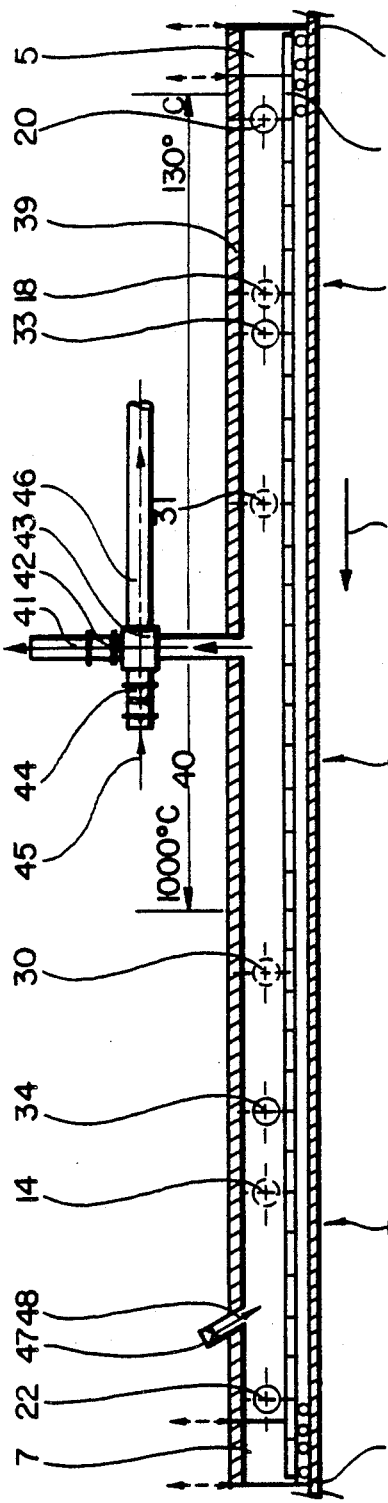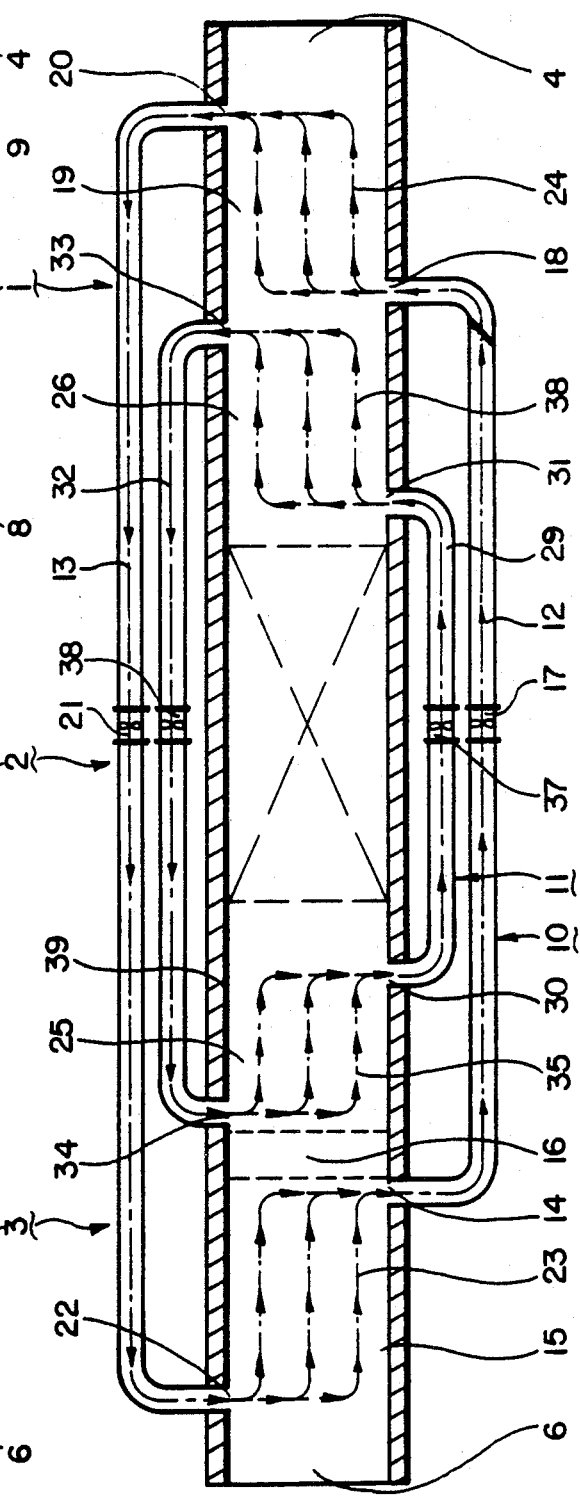

METHOD AND KILN FOR FIRING CERAMIC ARTICLES

BACKGROUND OF THE INVENTION

The present invention relates to through-type kilns and methods of operating same for firing molded ceramic articles, particularly bricks, wherein the ceramic articles are conveyed successively through preheating, firing and cooling zones of the kiln while an opposed counter-current air flow cools the ceramic articles within the cooling zone and heats the ceramic articles within the preheating zone.

So-called tunnel kilns are utilized in brick making plants for firing bricks on a generally continuous basis. The structure of such kilns defines a substantially linear tunnel through which the ceramic articles pass in succession in a substantially linear path of travel through a preheating zone into a firing zone and therefrom through a final cooling zone. Typically, such tunnel kilns may be of a length of between 100 and 200 meters. The ceramic articles to be fired are supported on a plurality of individual kiln cars connected end-to-end in a train and are preliminarily passed through a dryer before entering the preheating zone. Within the preheating zone, the ceramic articles are gradually subjected to increasing temperature as they travel to the firing zone, to minimize any possible cracking of the ceramic material resulting from dramatic temperature changes. Within the firing zone, the ceramic articles are subjected to intense heat which may reach temperatures of 1000° Centigrade or more. After firing, the ceramic articles are gradually cooled by passage through the cooling zone to reach a temperature of approximately 120° Centigrade before exiting the tunnel kiln.

The firing zone is preferably heated by gas-fueled burners. To facilitate the cooling and preheating of the ceramic articles within the respective cooling and preheating zones, a forced air current is directed into the tunnel kiln adjacent the exit end of the cooling zone to flow therefrom forwardly through the cooling, firing and preheating zones in opposition to the direction of travel of the ceramic articles through the tunnel kiln. In this manner, the relatively cool air entering the cooling zone aids in cooling the ceramic articles within such zone, the air gradually increasing in temperature as it flows through the cooling and firing zones into the preheating zone wherein the heated air assists in preheating the ceramic articles entering the kiln. Within the preheating zone, the heat exchange between the air current and the relatively cooler ceramic articles entering the kiln serves to re-cool the air before it is exhausted from the kiln via a chimney typically located at the entrance to the preheating zone.

In order to maintain the counter-current air flow as abovedescribed, it is necessary to maintain a pressure gradient through the tunnel kiln from the exit end of the cooling zone to the entrance end of the preheating zone. Since the air flow used for cooling and subsequently for preheating the ceramic articles is not recycled in a conventional tunnel kiln, it is common that approximately three kilograms of air are required for every kilogram of the ceramic articles to be fired. As will be readily recognized, a substantial amount of potential energy is lost in this process and, further, a significant negative impact on the environment results. If the exhausted air must be purified of gases and other substances released into the air current during the firing process, filter systems must be provided with a capacity to handle the air flow through the tunnel kiln.

It is known to recover a portion of the cooling air from the cooling zone and a portion of the heat energy from the air exhausted through the chimney of the tunnel kiln for use otherwise in the overall manufacturing operation. In brick making plants, the recovered energy is typically utilized to heat dryers for freshly formed bricks.

West German Patent Application S 21,776, filed Feb. 2, 1951 and published for opposition on June 26, 1952, discloses a through-type kiln wherein a preheating zone, a calcining zone and a cooling zone are arranged in succession to one another for conveyance therethrough of material to be treated. To provide cooling of the material in the cooling zone and heating of the material in the preheating zone, a counter-current of air is blown through the kiln in opposition to the direction of material conveyance but, in order to avoid unnecessary removal of heat from the calcining zone, the air current bypasses the calcining zone and flows directly from the cooling zone to the heating zone through the use of structural covers or closures arranged at opposite sides of the calcining zone. As an alternative to such a cover or closure system this application suggests that the kiln may be constructed to cause the material being treated to turn !80° while passing through the calcining zone from the preheating zone to the cooling zone so that the preheating and cooling zones are arranged directly adjacent one another to facilitate direct conveyance of the air flow from the cooling zone to the preheating zone. However, as will be understood, it would be highly impractical to attempt to utilize this kiln construction in a brick making kiln since the kiln cars fully loaded with bricks may weight several tons which, together with the temperatures of 1000° Centigrade or more prevailing in the firing zone, would present substantial difficulties in designing an economical means for accomplishing this manner of operation in a brick making kiln.

SUMMARY OF THE INVENTION

It is accordingly an object of the present invention to provide an improved kiln of the through-type, such as a tunnel kiln, having successive aligned preheating, firing and cooling zones, and a method of operating same, wherein energy consumption and the necessity for purifying kiln exhaust are considerably reduced. It is a particular object of the present invention to significantly reduce the total amount of air utilized in the operation of the kiln in comparison to conventional kilns while still providing an efficient exchange of energy between the cooling and preheating zones.

According to one aspect of the present invention, an improved method is provided for firing ceramic articles in a tunnel or like kiln of the through-type defining aligned successive preheating, firing and cooling zones wherein ceramic articles to be fired are conveyed in sequence through the zones. According to the present method, the ceramic articles are cooled in the cooling zone with relatively cooler air and heated in the preheating zone with relatively warmer air while essentially isolating the firing zone of the kiln from substantial flow of air therethrough between the preheating and cooling zones without the use of structural separation of the preheating, firing and cooling zones. Specifically, the present method provides for directing air to flow through at least a portion of the cooling zone in heat exchange relation with the ceramic articles for cooling thereof, then directing the air to flow outside the firing zone, and then directing the air to flow through at least a portion of the preheating zone in heat exchange relation with the ceramic articles for heating thereof.

In this manner, the air flow of the present method assures a direct exchange of heat between the preheating and cooling zones essentially without significant interchange of air between the firing zone and the preheating and cooling zones. Notably, as aforementioned, no structural separation exists between the preheating, firing and cooling zones under the present invention so that the zones are substantially open to one another and, accordingly, some exchange of air between the firing zone and the preheating and cooling zones will necessarily occur. Nevertheless, under the present invention, the predominant air flow is between the preheating and cooling zones with any air exchange between the firing zone and the preheating and cooling zones being sufficiently small in relation to have no adverse influence on the effects and advantages achieved by the present invention. It is accordingly in this context that the term "essentially" is used herein to define that the predominant flow of air through the kiln occurs between the preheating and cooling zones and bypasses the firing zone.

In this same regard, it is contemplated to be within the scope of the present invention that some flow of air may be intentionally caused to pass in one direction or the other through the firing zone, e.g., through the aid of a variable speed fan or fans, to achieve a controlled imbalance of the air circulated between the preheating and cooling zones. Such an air imbalance may offer the advantages of achieving a predetermined temperature curve within the kiln or shifting the main fire of the firing zone in one direction or the other. Nevertheless, in each case, the air flow directed through the firing zone is relatively small in comparison to the air flow circulated in accordance with the present invention between the preheating and cooling zones. The object of reducing energy consumption and reducing the necessity of purifying kiln exhaust is practically unaffected. Accordingly, the disclosure of the present invention herein is to be understood to encompass kilns operated with such a relatively small air flow through the firing zone although such is not further described herein.

According to the preferred method of the present invention, air is circulated between the cooling and preheating zones by withdrawing air from the cooling zone and directing such withdrawn air outside the firing zone and into the preheating zone while at the same time withdrawing air from the preheating zone and directing such withdrawn air outside the firing zone and into the cooling zone. Within each of the cooling and preheating zones, the air is preferably directed in opposition to the direction of conveyance of the ceramic articles.

By such a generally closed air circulation system, the heat absorbed by the air flowing within the cooling zone is nearly totally recaptured in the preheating zone. Since the air is flowing in a substantially continuous circuit, the air is constantly reused for transferring heat from the cooling zone to the preheating zone, on one hand, and for transferring cold from the preheating zone to the cooling zone. The air circulation system of the present method preferably is substantially closed except for the requirement for occasional purification of the circulating air, as hereinafter described, and except for unintended leakages and the like.

Thus, the firing zone of a kiln operated according to the present method functions in similar manner to that of a chamber kiln but without the use of structural walls enclosing the firing zone, the air circulating between the cooling and preheating zones essentially isolating the firing zone while the air therein remains substantially calm and unaffected in a manner analogous to that of the eye of a hurricane or tornado. Further, the firing zone is maintained at a somewhat higher air pressure as a result of air being withdrawn from the cooling zone, e.g., by suction, and, among other things, as a result of the admission of air and gas for firing the burners of the firing zone for the combustion process, whereby the relatively higher pressure of the firing zone likewise serves to essentially exclude the entrance of air from the cooling zone.

Within the firing zone, which generally has pre-fire, main-fire and post-fire areas, a localized flow of air may develop in the direction of the exhaust chimney, resulting in heat exchange between the pre-fire, main-fire and post-fire areas. Depending on the arrangement of the exhaust chimney, the temperature of the preheating zone may be upwardly corrected to compensate for any drop in the performance in the transfer of heat through the circulation of air from the cooling zone.

Preferably, the air directed from the cooling zone into the preheating zone is caused to flow through the preheating zone in opposition to the direction of conveyance of the ceramic articles before being withdrawn from the preheating zone. Thus, although the air flows outside the firing zone, a traditional counter-current flow of air is still achieved within the preheating zone for heating the ceramic articles therein.

Similarly, it is preferred that the air directed from the preheating zone into the cooling zone is caused to flow through the cooling zone in opposition to the direction of conveyance of the ceramic articles before being withdrawn from the cooling zone, whereby a traditional counter-current air flow is provided within the cooling zone for cooling the ceramic articles therein.

In order to avoid the entrance of outside air into the air flow circulating between the cooling and preheating zones, a closure, lock or the like is provided both at the entrance end of the preheating zone and at the exit end of the cooling zone to essentially prevent free exchange of the air within the cooling and preheating zones with the outside air. Accordingly, in a kiln operated according to the present method, the conditions prevailing within the kiln are substantially similar to that of a conventional tunnel kiln except for the essentially isolated firing zone, the kiln differing from the state of the art particularly in that the air transferred from the cooling zone to the preheating zone bypasses the firing zone and is then recirculated, again bypassing the firing zone, rather than being exhausted into the atmosphere.

In the preferred embodiment of the present method, air is circulated between the cooling and preheating zones in two concentric air circuits. In a first air circuit, air is withdrawn from a relatively cooler section of the cooling zone downstream of its crystal transition region and directed outside the firing zone into a relatively cooler upstream entrance section of the preheating zone, while air is withdrawn from the relatively cooler upstream entrance section of the preheating zone and directed outside the firing zone into the relatively cooler downstream section of the cooling zone. Simultaneously, air is circulated in a second air circuit by withdrawing air from a relatively warmer section of the cooling zone upstream of its crystal transition region and the withdrawn air is directed outside the firing zone into a relatively warmer downstream heating section of the preheating zone, while air is withdrawn from the relatively warmer downstream heating section of the preheating zone and directed outside the firing zone into the relatively warmer upstream section of the cooling zone.

In this manner, air from the cooler areas of the cooling zone is conveyed into the vicinity of the entrance to the preheating zone wherein the fresh ceramic articles entering the kiln are still relatively cooler than such air. Accordingly, the relatively cool ceramic articles entering the kiln are not heated in an undesirably rapid manner. Likewise, air from the relatively warmer area of the cooling zone immediately following the firing zone is directed into the area of the preheating zone immediately in advance of the firing zone to subject the ceramic articles to a complete heating in preparation for their entrance into the firing zone. Two advantages are thereby achieved. First, the crystal transition region within the cooling zone is essentially isolated from the air flow system. For this purpose, the concentric air circuits are preferably arranged so that the first air circuit draws essentially only from the relatively cooler area of the cooling zone wherein temperatures range up to approximately 500° Centigrade and the second air circuit draws essentially only from the warmer area of the cooling zone wherein temperatures range between approximately 600° and 850° Centigrade. Secondly, the preheating zone is provided with essentially two heating areas in succession with one another in the direction of conveyance of the ceramic articles through the preheating zone, i.e., a first relatively upstream heating area supplied by the first air circuit with relatively cooler air in the range of approximately 500° to 550° Centigrade and a second relatively downstream heating area supplied by the second air circuit with relatively warmer air in the range of approximately 800° to 850° Centigrade approaching the air temperature within the firing zone.

Thus, the temperature differentials between the cooling-heating air medium and the ceramic material to be fired are maintained within acceptable ranges in each area along the full length of the kiln. Moreover, the concentric air circuits serve to essentially divide the length of the kiln into differing sections having air pressure differentials which are reduced in comparison to tunnel kilns operated according to the state of the art, whereby much less so-called false air is drawn into the kiln.

According to one aspect of the present invention, the air withdrawn from the cooling zone is conveyed into the preheating zone under force intermittently and, likewise, the air withdrawn from the preheating zone is compatibly conveyed into the cooling zone under force intermittently, e.g., through the use of ventilation fans or the like operated either periodically or in a pulsing manner.

Preferably, under the method of the present invention, the circulation of air between the cooling and preheating zones is performed generally continuously and is generally closed to the entrance of outside air, until combustible substances released into the air during the performance of the method reach a sufficient concentration in the air to produce a combustible mixture, whereupon the combustible mixture is ignited, preferably by admitting additional fresh air. The ignition of the air mixture can be performed at regular time intervals or after a predetermined concentration of combustibles in the air is reached. Preferably, ignition of the combustible mixture is performed in the region of the preheating zone. After ignition, the products of combustion which have ceased burning are exhausted from the kiln, e.g., via a chimney.

In this manner, combustible materials within the ceramic articles, e.g., bitumen-like inclusions, organic substances, additives such as sawdust, styropore, coal slurry, or other selected scrap material added to the ceramic material to be fired, especially in the case of clay material used for bricks, which combustible material may be typically released from the ceramic articles, are collected in and transported with the circulating air until the combustible materials can be readily burned while still within the air circuit, whereby essentially only combusted waste materials are exhausted through the chimney of the kiln. Thus, even the heat energy released by burning the combustible materials may be utilized to heat the kiln. As will thus be understood, the recirculation of heating and cooling air provided by the present method achieves a significant savings in energy consumed as well as minimizing the release of potential pollutants into the air, because essentially only completely combusted material is exhausted through the chimney.

The present invention also provides an improved kiln structure of the through-type having successively aligned preheating, firing and cooling zones, the present invention being characterized by a first air conduit extending from the cooling zone to the preheating zone outside the firing zone and a second air conduit extending from the preheating zone to the cooling zone outside the firing zone, with the conduits being relatively arranged to produce a counter-current of the circulating air through each of the cooling and preheating zones. Circulation of air through the conduits and the cooling and preheating zones is achieved by provision of a ventilating fan or the like, a fan preferably being provided in each air conduit to provide a forced air flow from the cooling zone through the first air conduit into the preheating zone and another forced air flow from the preheating zone through the second air conduit into the cooling zone. In this manner, the preheating and cooling zones are pressurized to assist in dividing the individual zones. Preferably, the entrance opening of the first air conduit by which it communicates with the cooling zone is disposed more closely adjacent the firing zone than the exit opening of the second air conduit by which it communicates with the cooling zone, whereby the circulating air flows therebetween through the cooling zone in a direction opposite the direction of conveyance of the ceramic articles. Likewise, the exit opening of the first air conduit by which it communicates with the preheating zone is disposed more closely adjacent the firing zone than the entrance opening of the second air conduit by which it communicates with the preheating zone, whereby the circulating air flows therebetween to the preheating zone in a direction opposite the direction of conveyance of the ceramic articles.

In an embodiment providing two concentric air circuits as described above with respect to the present method, a third air conduit extends outside the firing zone from an entrance opening communicating with the cooling zone to an exit opening communicating with the preheating zone and a fourth air conduit extends outside the firing zone from an entrance opening communicating with the preheating zone to an exit opening communicating with the cooling zone. The entrance opening of the third air conduit is disposed more closely adjacent the firing zone than the exit opening of the fourth air conduit for flow of air therebetween through the cooling zone in a direction opposite the direction of conveyance of the ceramic articles. Likewise, the exit opening of the third air conduit is disposed more closely adjacent the firing zone than the entrance opening of the fourth air conduit for flow of air therebetween through the preheating zone in a direction opposite the direction of conveyance of ceramic articles.

Preferably, the entrance opening of one of the first and third air conduits is located upstream of the crystal transition region in the direction of conveyance of the ceramic articles and the entrance opening of the other of the first and third air conduits is located downstream of the crystal transition region, the exit opening of the one air conduit being located more closely adjacent the firing zone than the exit opening of the other air conduit. In this manner, the firing zone as well as the crystal transition zone as essentially isolated from the air circuits, and the preheating zone is provided with two successive heating areas, as aforedescribed.

Preferably, the air conduits are located at opposite longitudinal sides or on the ceiling of the kiln, the latter generally being preferred for space economy and other design reasons. However, in embodiments wherein two air circuits are provided and wherein it is desired to locate the air conduit at the longitudinal sides of the kiln, it is preferred that the first and third air conduits be located at one longitudinal side of the kiln and the second and fourth air conduit be located at the opposite longitudinal side of the kiln.

It may be advantageous in kilns wherein the tunnel area through the kiln is relatively wide transversely with respect to the direction of conveyance of the ceramic articles to equip the air conduits of at least one of the air circuits for selective independent air flow operation, e.g., by providing each air conduit with a selectively operable ventilating fan. Accordingly, by periodic operation of the air conduits, e.g., by selective actuation of their associated fans, a circulatory air flow with counter-current flow through each of the preheating and cooling zones is produced and a uniform air treatment of the ceramic articles is achieved while avoiding stagnant air zones.

Preferably, a lock or other closure is provided at the entrance end of the preheating zone and at the exit end of the cooling zone to minimize undesired entrance of outside air into the air circuits, making it possible to continuously circulate a large portion of the air present within the tunnel, even when the kiln cars are being transported. Accordingly, the need to heat additional incoming air is minimized and the costs for purifying exhaust gas are reduced.

It is contemplated within the scope of the present invention that the air withdrawn from the cooling zone is conveyed into the preheating zone in an intermittent non-continuous manner while at the same time the air withdrawn from the preheating zone is compatibly conveyed intermittently into the cooling zone, e.g., at a corresponding rate and rhythm. For example, the fans or other forced air ventilators utilized in the air conduits may be operated to convey the air withdrawn from the cooling and preheating zones in rhythmic regular pulses. Alternatively, the ventilators may be operated continuously for more extended periods of time and then deactuated for intervening periods of time, including the possibility of alternately operating the ventilators in associated air conduits. It is further contemplated that the air conduit of the first and third air conduits whose entrance opening is located downstream of the crystal transition region within the cooling zone may be periodically closed, e.g., by deactuating its ventilator fan, and at the same time the air conduit of the second and fourth air conduits whose entrance opening is located most closely adjacent the firing zone is closed during the same periods, while the other two air conduits are opened with their ventilators operating to create a single enlarged air circuit producing counter-current air flows through substantially the entire length of the cooling zone and substantially the entire length of the preheating zone, enabling combustible materials collecting in the air flow to be brought into close proximity to the firing zone for at least partial combustion. The operation of the kiln with intermittent air flows in the described manners aids in preventing the development of counter-current air flows through the firing zone and enhances the heating of the ceramic articles to a desirably elevated temperature before entering the firing zone. Additionally, a pulsating air flow avoids continuous heating of the ceramic articles, enabling them to partially recover from the heating between each pulse of air, which assists in avoiding development of cracks in the ceramic articles due to excessively rapid heating thereof.

Thus, in the present invention, the firing zone of a tunnel kiln or other through-type kiln is for the first time essentially isolated from any substantial air exchange with the adjacent zones of the kiln so that the air within the firing zone remains substantially calm to enhance the firing process. Accordingly, various types of firing operations can be carried out within the firing zone with substantially all of the advantages of a chamber-type kiln but without the substantial consumption of energy commonly associated with chamber kilns. For example, oxidizing or reducing processes, or alternations thereof, firing processes involving elevated or decreased relative air pressure within the firing zone, and firing processes with glaze, particularly salt glaze, may be carried out without the danger of an undesired release of potentially corrosive gases into other more sensitive areas of the kiln.

BRIEF DESCRIPTION OF THE DRAWINGS

FIG. 1 is a schematic top plan view of a tunnel kiln according to the preferred method and apparatus of the present invention; and FIG. 2 is a view, partially in vertical cross-section and partially in front elevation, through the tunnel kiln of FIG. 1.

DESCRIPTION OF THE PREFERRED EMBODIMENTS

Referring now to the accompanying drawings, a straight through-type kiln commonly referred to as a tunnel kiln is illustrated and basically includes a preheating zone 1, a firing zone 2, and a cooling zone 3, successively arranged in alignment with one another. Molded ceramic articles such as bricks are conveyed through the kiln from an entrance end 4 to an exit end 6 to travel successively through the preheating, firing and cooling zones 1,2,3, as represented by the arrow 8 indicating the direction of travel, by means of a train of kiln cars 9 on which the ceramic articles are stacked. A lock structure 5 is provided at the entrance end 4 to the preheating zone 1 and, similarly, a lock structure 7 is provided at the exit end 6 of the cooling zone 3 to generally close the interior of the tunnel kiln from significant air exchange with the ambient atmosphere.

In accordance with the present invention, an air circulation system is provided for circulating air between the preheating and cooling zones 1,3 while bypassing the intermediate firing zone 2. In the embodiment illustrated in the accompanying drawings, two air circuits are provided as generally indicated at 10,11, respectively, the air circuit 10 serving the outermost areas of the preheating and cooling zones 3 while the air circuit 11 serves the innermost areas thereof more closely adjacent the firing zone 2. The air conduits and ventilator fans forming the air circuits 10,11 as hereinafter more fully described, are preferably located at the ceiling of the kiln tunnel.

The outer air circuit 10 basically includes a first air conduit 12 extending from an entrance opening 14, which communicates with a relatively cooler area 15 of the cooling zone 3 at its downstream end (as viewed in the direction of travel 8 of ceramic articles conveyed through the kiln) following the crystal transition region 16 of the cooling zone 3, exteriorly of the kiln outside the firing zone 2 to an exit opening 18, which communicates with a relatively cooler area 19 of the preheating zone 1 at its upstream, i.e., entrance, end. A ventilator fan 17 is provided in the air conduit 12 at an intermediate location along its length to withdraw air from the cooler area 15 of the cooling zone 3 and deliver a forced flow of the withdrawn air into the cooler area 19 of the preheating zone 1. The exit opening 18 is selectively located at an intermediate position along the length of the preheating zone 1 whereat the temperature of the air delivered thereto from the cooling zone 3 is sufficiently warm to provide a preheating of the ceramic articles within the preheating zone 1 without potentially damaging overheating thereof.

The outer air conduit 10 also includes a second air conduit 13 extending from an entrance opening 20, which communicates with the upstream end of the cooler area 19 of the preheating zone 1 adjacent the lock structure 5 at the entrance end 4 of the preheating zone 1, exteriorly of the kiln outside the firing zone 2 to an exit opening 22 at the downstream end of the cooler area 15 of the cooling zone 3 adjacent the lock structure 7 at the exit end 6 of the cooling zone 3. A ventilator fan 21 is provided in the air conduit 13 intermediately along its length for withdrawing air from the upstream end of the preheating zone 1 and delivering a forced flow of the withdrawn air into the downstream end of the cooling zone 3. As will be understood, the air entering the cooling zone 3 through the exit opening 22 of the air conduit 13 travels in a counter-current flow through the relatively cooler area 15 of the cooling zone 3 in opposition to the direction of conveyance 8 of the ceramic articles through the kiln, as indicated at 23, to the entrance opening 14 of the first air conduit 12. Similarly, the air entering the preheating zone 1 through the exit opening 18 of the air conduit 12 moves in a counter-current air flow through the relatively cooler area 19 of the preheating zone 1 opposite the direction of travel 8 of the ceramic articles, as indicated at 24, to the entrance opening 20 of the second air conduit 13.

Similarly, the inner air circuit includes a third air conduit 29 and a fourth air conduit 32 which connect a relatively warmer area 25 of the cooling zone 3 with a relatively warmer area 26 of the preheating zone 1, which areas are located more closely adjacent the firing zone 2 than the relatively cooler outward endwise areas 15,19 of the cooling and preheating zones. The air conduit 29 extends from an entrance opening 30, which communicates with the relatively warmer area 25 of the cooling zone 15 at a location adjacent the firing zone 2, exteriorly of the kiln to an exit opening 31, which communicates with the relatively warmer area 26 of the preheating zone 1 at a location adjacent the firing zone 2. The air conduit 32 extends from an entrance opening 33, which communicates with the relatively warmer area 26 of the preheating zone 1 at a location upstream from the exit opening 31 of the conduit 29 but slightly downstream of the exit opening 18 of the conduit 12, exteriorly of the kiln to an exit opening 34, which communicates with the relatively warmer area 25 of the cooling zone 3 at a downstream location from the entrance opening 30 to the conduit 29 but upstream of the crystal transition region 16 of the cooling zone 3. Each of the air conduits 29,32 of the inner air circuit 11 are equipped with ventilator fans 37,38, respectively, for providing a forced circulation of air through the conduits 29,32, including counter-current air flows 35,36 therebetween through the relatively warmer areas 25,26 of the cooling and preheating zones.

As will thus be understood, as ceramic articles such as bricks are conveyed progressively through the kiln, the articles initially pass through the upstream area 19 of the preheating zone 1 wherein the articles are subjected to the counter-current air flow 24 which, while being relatively cooler than the downstream area 26 of the preheating zone 1, is sufficiently warmer than the ceramic articles entering the kiln so as to release heat from the counter-current air flow 24 to the articles to begin preheating them. As the articles continue through the preheating zone 1, their temperature is further elevated by passing in similar heat exchange relation to the counter-current 36 of relatively warmer air within the downstream area 26 of the preheating zone 1. After passage through the firing zone 2, the ceramic articles, whose temperature has been substantially elevated within the firing zone 2, move through the upstream area 25 of the cooling zone 3 wherein the articles are subjected to the counter-current air flow 35, which was previously cooled by passing in heat exchange relation with the ceramic articles in the area 26 of the preheating zone 1 in advance of the firing zone 2, to begin cooling of the ceramic articles. In doing so, the counter-current air flow 35 takes on heat from the ceramic articles so as to again elevate the temperature of the air flow for again preheating ceramic articles in the downstream area 26 of the preheating zone 1. The ceramic articles next progress through the crystal transition region 16 of the cooling zone 3 and then through the downstream area 15 of the cooling zone 3 wherein the articles are further cooled by the counter-current air flow 23, which is relatively cooler than the counter-current air flow 35, having previously passed in heat exchange relation with the relatively cooler ceramic articles entering the kiln through the upstream area 19 of the preheating zone 1. As the air flow 23 further cools the ceramic articles, the air flow takes on heat therefrom to enable the air flow to once again serve a preheating function within the upstream area 19 of the preheating zone 1. In this manner, the air circulating through the air circuits 10,11 is continuously recycled while being heated and cooled in alternation to serve a cooling function within the cooling zone 3 and a preheating function within the preheating zone 1.

The tunnel structure, indicated in its entirety at 39, is equipped with a chimney 41 (FIG. 2) for exhausting gases from the tunnel interior, the chimney 41 preferably being located within a lengthwise extent 40 of the tunnel spanning the preheating and firing zones 1,2. As illustrated, the chimney structure 41 is provided with a controllable (e.g., pressure-regulated, speed-regulated or equipped with a control valve) ventilator fan 42 for conveying exhaust gases through the chimney, a heat exchanger 43 for extracting excessive heat from exhaust gases, and an exhaust gas filtering arrangement (not shown). The location along the area 40 at which kiln gases are to be exhausted and, in turn, the location of the chimney 41 and its ventilating fan 42 may be selected according to the desired temperature of the exhaust gases, the fuel being utilized in the firing zone, the particular ceramic material being fired, and/or particular environmental considerations and requirements. When the tunnel kiln is operated essentially with recirculated air as above-described, the amount of exhaust gas withdrawn from the kiln is typically only within the range of approximately 20 to 25% of the total amount of gas exhausted in conventional tunnel kilns of the most advanced design.

Preferably, the chimney 41 in the present invention is connected to the tunnel 39 in a suitable manner permitting selective positioning and repositioning of the chimney along the kiln, even during ongoing operation thereof, to take into account the individual properties of the particular ceramic material being fired and/or other considerations and parameters of the particular kiln operation. For this purpose, it is contemplated that the chimney may be connected to the kiln tunnel 39 in a manner permitting selective shifting movement of the chimney to various positions along the length of the kiln. For example, a change in the position of the chimney may be desirable to exhaust recirculated air which has been ignited to purify it of combustible substances released into the air during the kiln operation, as above-described.

In operation of the present kiln as described, air temperatures may reach approximately 800° to 850° Centigrade within the air conduit 29, approximately 550° to 600° Centigrade within the air conduit 32, approximately 500° Centigrade within the air conduit 12, and approximately 120° to 200° Centigrade within the air conduit 13.

Any gases and other combustible substances released into the circulating air from the ceramic material being fired, even in a range up to approximately 550° Centigrade, e.g., with polystyrene or sawdust used in porous bricks, may be ignited and utilized for supplying heat energy to the kiln. In the present invention, it is contemplated that such ignition of combustible substances may be accomplished in two manners.

In a first embodiment, the ventilator fan in the air conduits 12,32, which transport heated air within the range of 500° to 600° Centigrade, are deactuated at selected intervals of time, leaving a single air circuit comprised of air conduits 29 and 13 within which substantially larger air temperature gradients prevail, for example, ranging from approximately 850° to 120° Centigrade within the preheating zone and from approximately 120° to 850° Centigrade within the cooling zone. The combustible gases and other substances conveyed within the circulating air are therefore substantially completely burned and pass to the chimney 41 for exhaustion.

Secondly, a relatively small quantity of fresh ambient air, indicated at 48 in FIG. 2, may be admitted into the cooling zone 3 through a selectively openable and closeable air inlet 47, the additional fresh air 48 being sufficient to direct the recirculating air within the kiln to flow to the firing zone 2 wherein the combustible gases and other substances within the circulating air are completely burned. Only a small amount of fresh air 48, in relation to the total amount of recirculating air within the kiln, is necessary to be admitted to achieve this result, whereby the corresponding energy losses are maintained relatively small. The exhaust gas at the chimney 41 is therefore limited to essentially only three components, i.e., the combustion air at the burners within the firing zone 2, the supply air to the burners and/or high speed gasification burners, and possibly the fresh air 48, which may also be admitted into the kiln at other positions than that shown in the drawing.

The temperature of the throttled amount of gas exhausted through the chimney 41 is dependent only on the selected position along the kiln from which the gases are exhausted and may range from approximately 120° Centigrade adjacent the entrance end 4 of the preheating zone 1 to 1000° Centigrade or more within the firing zone 2. It is contemplated that the most economical operation of the kiln is achieved by positioning of the chimney 41 relatively closely to the kiln entrance end 4 whereat the exhaust gas temperatures are lowest.

Since the amount of gases exhausted from the kiln of the present invention is only a small proportion of the total amount of gases commonly exhausted from conventional tunnel kilns, the present invention achieves the advantages of not only reducing energy consumption but also reducing the requirements for filtration of the kiln exhaust, whereby the exhaust filtration system may be relatively smaller and less expensive than with conventional kilns in correspondence to the reduced amount of exhaust gases.

In instances wherein gases are to be exhausted to the chimney 41 from relatively hotter locations along the kiln, the provision of the heat exchanger 43 within the chimney structure provides the advantage of enabling at least a proportion of the heat energy within the exhausted gases to be recovered. Since the total amount of gas exhausted from the present kiln is relatively small in comparison to conventional kilns, the heat exchanger may be of a correspondingly reduced capacity.

The energy consumption of tunnel kilns operated on a continuous basis with an air circulation system according to the present invention may be analyzed in the following manner, without taking into consideration a certain loss of heat energy by radiation from the kiln. First, the energy consumption for the actual firing process within the firing zone 2, including heat loss through the chimney and ceramic material conversion, is in the range of 10 to 15 cubic meters of natural gas per metric ton of ceramic material to be fired at a kiln output of 10 metric tons of ceramic material being fired per hour. Specifically, 1 cubic meter of natural gas corresponds to 9000 WE heat units and 90 WE heat units are required per kilogram of material to be fired, whereby 1 cubic meter of natural gas is required for every 100 kilograms of ceramic material being fired. Further, approximately 10 to 15 kilograms of air are necessary for burning each cubic meter of natural gas.

In addition to the actual firing process, electric energy is required for operating the ventilators to the firing burners as well as the ventilator fans within the chimney and within the air conduits. At an individual output of approximately 25000 kilograms of air per hour, up to 35 kilowatts of electrical power is necessary to operate these ventilators (it being noted that electrical power within this magnitude is required in conventional tunnel kilns equipped with an energy exchange system with a parallel-connected dryer).

As will be understood, the air conduits should be provided with an appropriate cross-sectional area and the ventilator fans associated with the conduit should be of a selected volumetric air output capacity to handle the volume of air circulated within the kiln at the prevailing temperatures. Since it is well known that the volume of air changes considerably in relation to its temperature, the ventilator fans should be selected for the associated air conduits to handle substantially equivalent amounts of air by weight rather than volume in order to appropriately maintain a controlled equilibrium between the preheating and cooling zones and thereby to prevent air flow in one direction or the other through the firing zone. By way of example in this regard, since it is known that 1 kilogram of air has a volume of approximately 1.25 cubic meters at 160° Centigrade, approximately 2.5 cubic meters at 600° Centigrade, and approximately 3.25 cubic meters at 850° Centigrade, the conduit 12 and its ventilator fan 17 must be configured and adapted to handle approximately 2 cubic meters of air for every 1 cubic meter of air conveyed by the associated air conduit 13 and its ventilator fan 21.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method of firing ceramic articles in a through-type kiln defining aligned successive preheating, firing, and cooling zones, said cooling zone including a crystal transition region intermediately along the cooling zone generally defining a relatively cooler section of the cooling zone downstream of the crystal transition region in the direction of conveyance of the ceramic articles and a relatively warmer section of the cooling zone upstream of the crystal transition region, and said preheating zone having a relatively cooler entrance section spaced upstream from the firing zone and a relatively warmer downstream heating section adjacent the firing zone, the method comprising the steps of conveying ceramic articles to be fired in sequence through the preheating, firing and cooling zones of the kiln, and cooling the ceramic articles in the cooling zone with relatively cooler air and heating the ceramic articles in the preheating zone with relatively warmer air while essentially isolating the firing zone of the kiln from substantial flow of air therethrough between the preheating and cooling zones without structural separation of the preheating, firing and cooling zones without structural separation of the preheating, firing and cooling zones by directing air to flow through at least a portion of the cooling zone in heat exchange relation with the ceramic articles for cooling thereof, then directing the air to flow outside the firing zone, and then directing the air to flow through at least a portion of the preheating zone and heat exchange relation with the ceramic articles for heating thereof, said directing steps including circulating air in a first air circuit between the cooling and preheating zones by withdrawing air from the relatively cooler downstream section of the cooling zone and directing the withdrawn air outside the firing zone and into the relatively cooler upstream entrance section of the preheating zone while withdrawing air from the relatively cooler upstream entrance section of the preheating zone and directing any withdrawn air outside the firing zone and into the relatively cooler downstream section of the cooling zone, and simultaneously circulating air in a second air circuit between the cooling and preheating zones by withdrawing air from the relatively warmer upstream section of the cooling zone and directing the withdrawn air outside the firing zone and into the relatively warmer downstream heating section of the preheating zone while withdrawing air from the relatively warmer downstream heating section of the preheating zone and directing the withdrawn air outside the firing zone and into the relatively warmer upstream section of the cooling zone.

2. A method of firing ceramic articles in a through-type kiln defining aligned successive preheating, firing and cooling zones, comprising the steps of conveying ceramic articles to be fired in sequence through the preheating, firing and cooling zones of the kiln, and cooling the ceramic articles in the cooling zone with relatively cooler air and heating the ceramic articles in the preheating zone with relatively warmer air while essentially isolating the firing zone of the kiln from substantial flow of air therethrough between the preheating and cooling zones without structural separation of the preheating, firing and cooling zones by directing air to flow through at least a portion of the cooling zone in heat exchange relation with ceramic articles for cooling thereof, then directing the air to flow outside the firing zone, and then directing the air to flow through at least a portion of the preheating zone in heat exchange relation with the ceramic articles for heating thereof, said directing steps including circulating air between the cooling and preheating zones by withdrawing air from the cooling zone and conveying the withdrawn air outside the firing zone and under force intermittently into the preheating zone while withdrawing air from the preheating zone and compatibly conveying the withdrawn air outside the firing zone and under force intermittently into the cooling zone, said circulating of air between the cooling and preheating zones being performed generally continuously and generally closed to the entrance of outside air until combustible substances released into the air during the performance of the method reach a sufficient concentration in the air to render a combustible air-substance mixture and then igniting the mixture.

3. A method of firing ceramic articles according to claim 1 and characterized further by directing air through the preheating zone in opposition to the direction of conveyance of the ceramic articles.

4. A method of firing ceramic articles according to claim 1 and characterized further by directing air through the cooling zone in opposition to the direction of conveyance of the ceramic articles.

5. A method of firing ceramic articles according to claim 1 wherein the cooling zone includes a crystal transition region intermediately along the cooling zone generally defining a relatively cooler section of the cooling zone downstream of the crystal transition region in the direction of conveyance of the ceramic articles and a relatively warmer section of the cooling zone upstream of the crystal transition region, and the preheating zone having a relatively cooler entrance section spaced upstream from the firing zone and a relatively warmer downstream heating section adjacent the firing zone, the method being characterized further by circulating air in a first air circuit between the cooling and preheating zones by withdrawing air from the relatively cooler downstream section of the cooling zone and directing the withdrawn air outside the firing zone and into the relatively cooler upstream entrance section of the preheating zone while withdrawing air from the relatively cooler upstream entrance section of the preheating zone and directing the withdrawn air outside the firing zone and into the relatively cooler downstream section of the cooling zone, and simultaneously circulating air in a second air circuit between the cooling and preheating zones by withdrawing air from the relatively warmer upstream section of the cooling zone and directing the withdrawn air outside the firing zone and into the relatively warmer downstream heating section of the preheating zone while withdrawing air from the relatively warmer downstream heating section of the preheating zone and directing the withdrawn air outside the firing zone and into the relatively warmer upstream section of the cooling zone.

6. A method of firing ceramic articles according to claim 2 and characterized further in that the igniting of the combustible mixture includes admitting additional air.

7. A method of firing ceramic articles according to claim 2 and characterized further by performing the igniting of the combustible mixture in the region of the preheating zone.

8. A method of firing ceramic articles according to claim 2 and characterized further by exhausting the products of combustion following the igniting of the combustible mixture.

9. A through-type kiln for firing ceramic articles comprising aligned successive preheating, firing and cooling zones, means for conveying molded ceramic articles to be fired in sequence through the preheating, firing and cooling zones of the kiln, and means for cooling the ceramic articles in the cooling zone with relatively cooler air and for heating the ceramic articles in the preheating zone with relatively warmer air, said cooling and heating means being arranged for essentially isolating the firing zone of the kiln from substantial flow of air therethrough between the preheating and cooling zones without structural separation of the preheating, firing and cooling zones, said cooling and heating means including means for directing air to flow through at least a portion of the cooling zone in heat exchange relation with the ceramic articles for cooling thereof, then to flow outside the firing zone, and then to flow through at least a portion of the preheating zone in heat exchange relation with the ceramic articles for heating thereof, said cooling and heating means comprising a first air conduit extending from the cooling zone to the preheating zone outside the firing zone, a second air conduit extending from the preheating zone to the cooling zone outside the firing zone, the first air conduit having an entrance opening communicating with the cooling zone and an exit opening communicating with the preheating zone and the second air conduit having an entrance opening communicating with the preheating zone and an exit opening communicating with the cooling zone, the entrance opening of the first air conduit being disposed more closely adjacent the firing zone than the exit opening of the second air conduit for flow of air therebetween through the cooling zone in a direction opposite the direction of conveyance of the ceramic articles and the exit opening of the first air conduit being disposed more closely adjacent the firing zone than the entrance opening of the second air conduit for flow of air therebetween through the preheating zone in a direction opposite the direction of conveyance of the ceramic articles, a third air conduit extending outside the firing zone from an entrance opening communicating with the cooling zone to an exit opening communicating with the preheating zone and a fourth air conduit extending outside the firing zone from an entrance opening communicating with the preheating zone to an exit opening communicating with the cooling zone, the entrance opening of the third air conduit being disposed more closely adjacent the firing zone than the exit opening of the fourth air conduit for flow of air therebetween through the cooling zone in a direction opposite the direction of conveyance of the ceramic articles and the exit opening of the third air conduit being disposed more closely adjacent the firing zone than the entrance opening of the fourth air conduit for flow of air therebetween through the preheating zone in a direction opposite the direction of conveyance of the ceramic articles.

10. A through-type kiln for firing ceramic articles according to claim 9 and characterized further in that the cooling zone includes a crystal transition region intermediately along the cooling zone, the entrance opening of one of the first and third air conduits being located upstream of the crystal transition region in the direction of conveyance of the ceramic articles, the entrance opening of the other of the first and third air conduits being located downstream of the crystal transition region, and the exit opening of the one air conduit being located more closely adjacent the firing zone than the exit opening of the other air conduit.

11. A through-type kiln for firing ceramic articles according to claim 9 and characterized further in that the first and second air conduits and their respective entrance and exit openings are located at opposite longitudinal sides of the kiln.

12. A through-type kiln for firing ceramic articles according to claim 9 and characterized further by means for generally closing the opposite outward ends of the kiln to entrance of ambient air.

13. A through-type kiln for firing ceramic articles according to claim and characterized further by an exhaust chimney selectively positionable along the kiln.

* * * * *